(12) United States Patent
Medina

(10) Patent No.: US 11,554,852 B2
(45) Date of Patent: Jan. 17, 2023

(54) HORIZONTAL STABILIZER TRIM ACTUATOR ASSEMBLY

(71) Applicant: Goodrich Actuation Systems SAS, Buc (FR)

(72) Inventor: Raphael Medina, Écouen (FR)

(73) Assignee: GOODRICH ACTUATION SYSTEMS SAS, St Ouen l'Aumone (FR)

( * ) Notice: Subject to any disclaimer, the term of this patent is extended or adjusted under 35 U.S.C. 154(b) by 396 days.

(21) Appl. No.: 16/167,715

(22) Filed: Oct. 23, 2018

(65) Prior Publication Data

US 2019/0202545 A1    Jul. 4, 2019

(30) Foreign Application Priority Data

Dec. 28, 2017  (EP) ...................................... 17306961

(51) Int. Cl.
| | | |
|---|---|---|
| B64C 13/50 | (2006.01) | |
| G05D 1/00 | (2006.01) | |
| B64C 13/22 | (2006.01) | |
| B64C 13/04 | (2006.01) | |

(52) U.S. Cl.
CPC ............ B64C 13/503 (2013.01); B64C 13/04 (2013.01); B64C 13/0427 (2018.01); B64C 13/22 (2013.01); B64C 13/506 (2018.01); G05D 1/0061 (2013.01)

(58) Field of Classification Search
CPC ... B64C 13/503; B64C 13/22; B64C 13/0427; B64C 13/506; B64C 13/04; G05D 1/0061
See application file for complete search history.

(56) References Cited

U.S. PATENT DOCUMENTS

| | | | | |
|---|---|---|---|---|
| 2,696,956 | A | * | 12/1954 | Farr ...................... B64C 13/341 244/230 |
| 3,038,352 | A | * | 6/1962 | Murphy .................. H02K 7/06 475/2 |
| 4,825,375 | A | * | 4/1989 | Nadkarni ............. G05D 1/0607 244/178 |
| 4,840,031 | A | | 6/1989 | Hribar |
| 5,286,203 | A | * | 2/1994 | Fuller ...................... G09B 9/28 244/178 |
| 6,439,512 | B1 | * | 8/2002 | Hart ...................... B64C 13/505 244/178 |
| 6,860,452 | B2 | | 3/2005 | Bacon et al. |
| 7,556,224 | B2 | | 7/2009 | Johnson et al. |
| 7,658,349 | B2 | | 2/2010 | Abel et al. |
| 8,376,283 | B2 | | 2/2013 | Grieser |

(Continued)

FOREIGN PATENT DOCUMENTS

| | | |
|---|---|---|
| DE | 102011115362 A1 | 4/2013 |
| EP | 1310848 A1 | 5/2003 |
| EP | 2415669 A1 | 2/2012 |

OTHER PUBLICATIONS

Extended European Search Report for International Application No. 17306961.8 dated Jun. 8, 2018, 7 pages.

(Continued)

Primary Examiner — Medhat Badawi
Assistant Examiner — Vicente Rodriguez
(74) Attorney, Agent, or Firm — Cantor Colburn LLP

(57) ABSTRACT

An assembly for manual control of an HSTA for controlling the position of a moveable surface, the assembly comprising a user-operated manual control element (1') e.g. a trim wheel in the cockpit, a first motor and a first resolver connected to the manual control element and a second motor and a second resolver arranged to communicate with the first motor and the first resolver and to cause corresponding movement of the actuator, in use.

2 Claims, 3 Drawing Sheets

(56) References Cited

U.S. PATENT DOCUMENTS

| | | |
|---|---|---|
| 8,812,177 B2 | 8/2014 | Yates et al. |
| 8,935,015 B2 | 1/2015 | Olsoe et al. |
| 8,960,031 B2 | 2/2015 | Keech et al. |
| 9,193,438 B2 | 11/2015 | Lebernicheux et al. |
| 9,340,278 B2 | 5/2016 | Hagerott et al. |
| 2007/0271008 A1* | 11/2007 | Ciholas ............... B64C 13/30 701/3 |
| 2008/0156939 A1* | 7/2008 | Hanlon ............... B64C 13/507 244/223 |
| 2011/0251739 A1 | 10/2011 | Tomas et al. |
| 2012/0290153 A1* | 11/2012 | Olsoe ............... B64C 13/505 701/3 |
| 2013/0001357 A1* | 1/2013 | Cyrot ............... B64C 13/505 244/99.4 |
| 2015/0108281 A1* | 4/2015 | Antraygue .......... B64C 13/0421 244/223 |
| 2015/0344128 A1 | 12/2015 | Sandri |
| 2016/0046364 A1* | 2/2016 | Buethe ............... B64C 13/503 244/228 |

OTHER PUBLICATIONS

EPO Official Letter for Application No. 17306961.8, dated Sep. 1, 2020, 10 Pages.

John S. Duncan: "Advisory Circular 25, 1329-1C—Approval of Flight Guidance Systems", Oct. 27, 2014 (Oct. 27, 2014), pp. 1-120, XP055724204, Retrieved from the Internet: URL:https://www.faa/gov/documentLibrary/media/Advisory_Circular/AC_25_1329-1C_CHG_1_.pdf [retrieved on Aug. 20, 2020].

\* cited by examiner

HORIZONTAL STABILIZER TRIM ACTUATOR ASSEMBLY

FOREIGN PRIORITY

This application claims priority to European Patent Application No. 17306961.8 filed Dec. 28, 2017, the entire contents of which is incorporated herein reference.

TECHNICAL FIELD

The present disclosure is concerned with controlling actuators that move moveable surfaces such as aircraft wings, slats and flaps, especially but not exclusively with horizontal stabilizer trim actuator (HSTA) control and, in particular, with HTSA assemblies having automatic and manual control.

BACKGROUND

HSTAs, also known as trimmable horizontal stabilizer actuators (THSAs), are actuators that move tail surfaces to trim an aircraft. The actuator must have a very high structural integrity to move a large surface in response to trim signals from the pilot or autopilot. Severe working environment, workloads and criticality of THSA function makes the system's engineering and manufacturing very complex.

Conventionally, in aircraft, the actuators are hydraulic actuators, but more recently it has become more common to use electromechanical stabilizer actuators, particularly for larger aircraft. Similar actuators are used to position other moveable surfaces in aircraft such as wings, slats, flaps and rudders.

On some types of aircraft, conventional HSTAs are commanded by, usually, three independent motors connected to the flight control computer (FCC) which drives a hydraulic control valve to control the position of the movable surfaces. Position feedback is provided to enable more accurate surface position control. Such systems are known from, e.g. U.S. Pat. Nos. 4,840,031 and 6,439,512.

Many aircraft are now also provided with a manual control for the HSTA, as a back-up to the automatic control. Using the manual control, the pilot can directly drive the actuator from the cockpit by means of a manual handle or trim wheel. The trim wheel is usually installed in the cockpit central panel or elsewhere in the cockpit easily accessible to the pilot. The pilot can select to control the HSTA manually and thus override the FCC. A back-up flight control system is taught, for example, in U.S. Pat. No. 8,935,015. Such HSTA architecture is used, for example, in some fly-by-wire programs.

Although the manual back-up control has safety-related advantages—i.e. in the case of failure of the automatic control, the manual control is also particularly useful in setting the horizontal trim to the best position during take-off. The pilot takes the actual position of the trim wheel in front of him, that he is turning, as an indication of the position of the trim.

The linkage between the manual trim wheel and the input to the HSTA is, however, a complex system made of cables and pulleys etc. The system is quite bulky and heavy and maintenance is also time intensive, difficult and expensive.

An HSTA assembly is desired that addresses these issues.

SUMMARY

According to the present disclosure, there is provided an assembly for manual control of an actuator for controlling the position of a moveable surface, the assembly comprising a user-operated manual control element, and transfer means configured to translate movement of the manual control element to movement of an actuator associated therewith, in use; the transfer means comprising a first motor and a first resolver connected to the manual control element and a second motor and a second resolver arranged to communicate with the first motor and the first resolver and to cause corresponding movement of the actuator, in use.

Preferably, the actuator is a HSTA, although it is envisaged that the assembly could be used to control other types of actuator that control movable surfaces in aircraft and also in other applications.

The manual control element should be configured such that the user moves it by an amount or degree corresponding to or proportional to the desired movement of the actuator and of the movable surface. In a preferred example, this is a rotatable element such as a wheel or, more specifically, a trim wheel.

In a preferred embodiment, the second resolver provides a signal as feedback to the first motor, indicative of the actual position of the actuator. This may also be provided while the actuator is being driven in an automatic mode e.g. by the FCC. The feedback is translated to movement of the manual control element e.g. the trim wheel so that the actual orientation of the wheel represents the position of the actuator, providing a visual indication to the user looking at the manual control element.

A mechanism is preferably provided to override automatic control of the actuator on actuation of the manual control element.

In one embodiment, one of the motors usually used for automatic control of the actuator is connected for use as the second motor in the manual control when manual control is selected. When the manual control element is operated, automatic control is disabled, and the function of one of the motors used for automatic control changes to operate as the second motor in manual control.

BRIEF DESCRIPTION OF THE DRAWINGS

Preferred embodiments will now be described with reference to the drawings, wherein.

DETAILED DESCRIPTION

Figure 1:
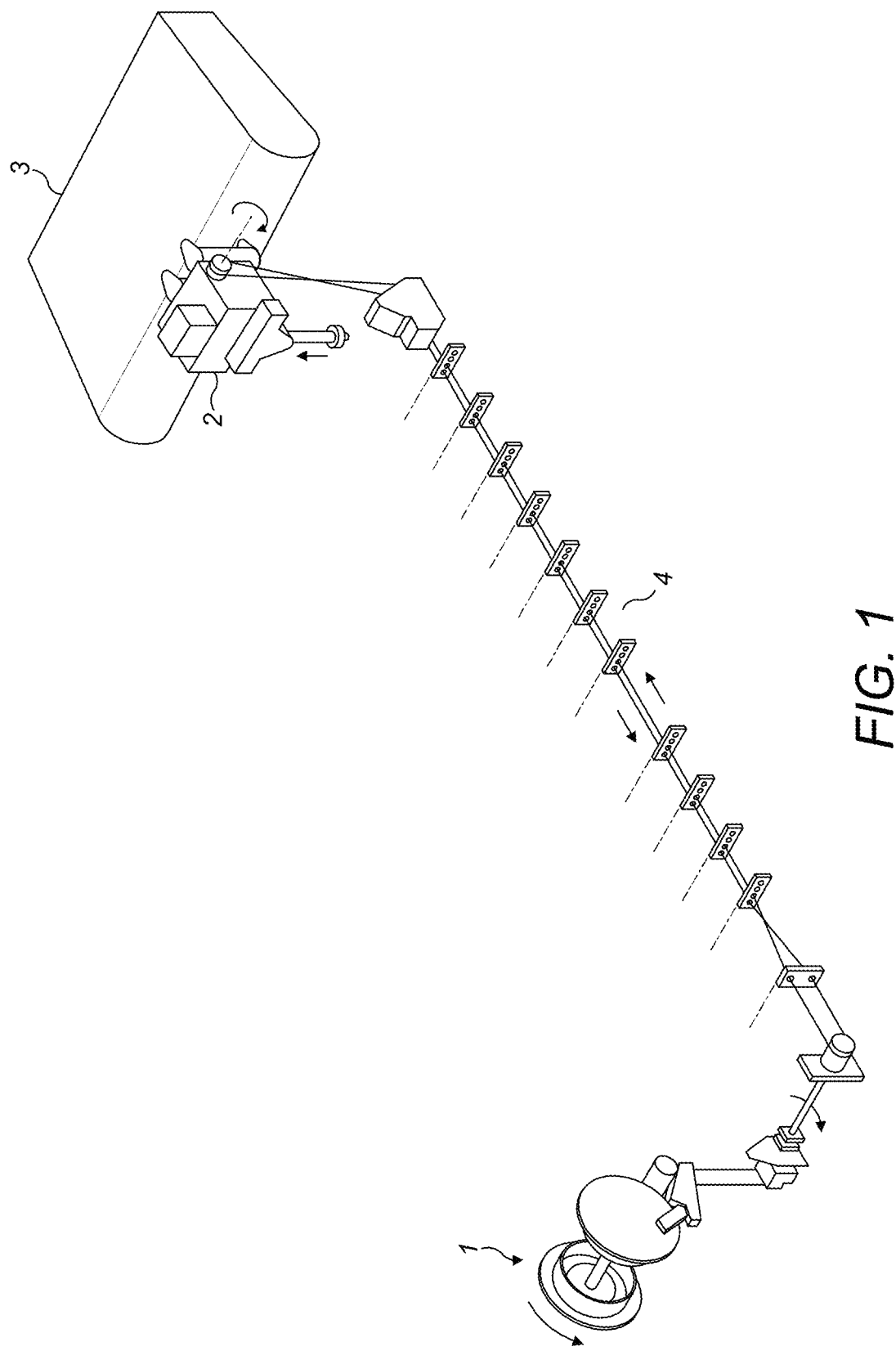
FIG. 1 is a schematic view of a conventional manual trim control system.

A conventional manual trim will now be briefly described with reference to FIG. 1. The description relates to the control of a horizontal stabilizer, but the same principles also apply to other moveable surfaces, flaps etc. driven by an actuator.

A trim wheel 1 is provided in the cockpit e.g. in the cockpit central panel to be easily accessible to the pilot. For manual control of the HSTA, the pilot turns the trim wheel by an amount corresponding to the amount that the tail stabilizer 3 or other moveable surface is to be adjusted. Rotation of the trim wheel 1 is translated by a linkage 4 comprising links, cables and pulleys, to the actuator 2, and corresponding movement of the actuator drives the moveable surface 3 as commanded. The pilot is informed by the rotary position of the trim wheel 1 of the position of the moveable surface 3. The rotary position of the trim wheel 1 also informs the pilot of the position of the moveable surface 3 when it has been driven automatically, as the trim wheel 1 is back driven by the linkage 4 responsive to movement of the HSTA.

As mentioned above, the linkage in such systems is complex and bulky and position feedback is not highly accurate due to the long transfer chain.

Figure 2:
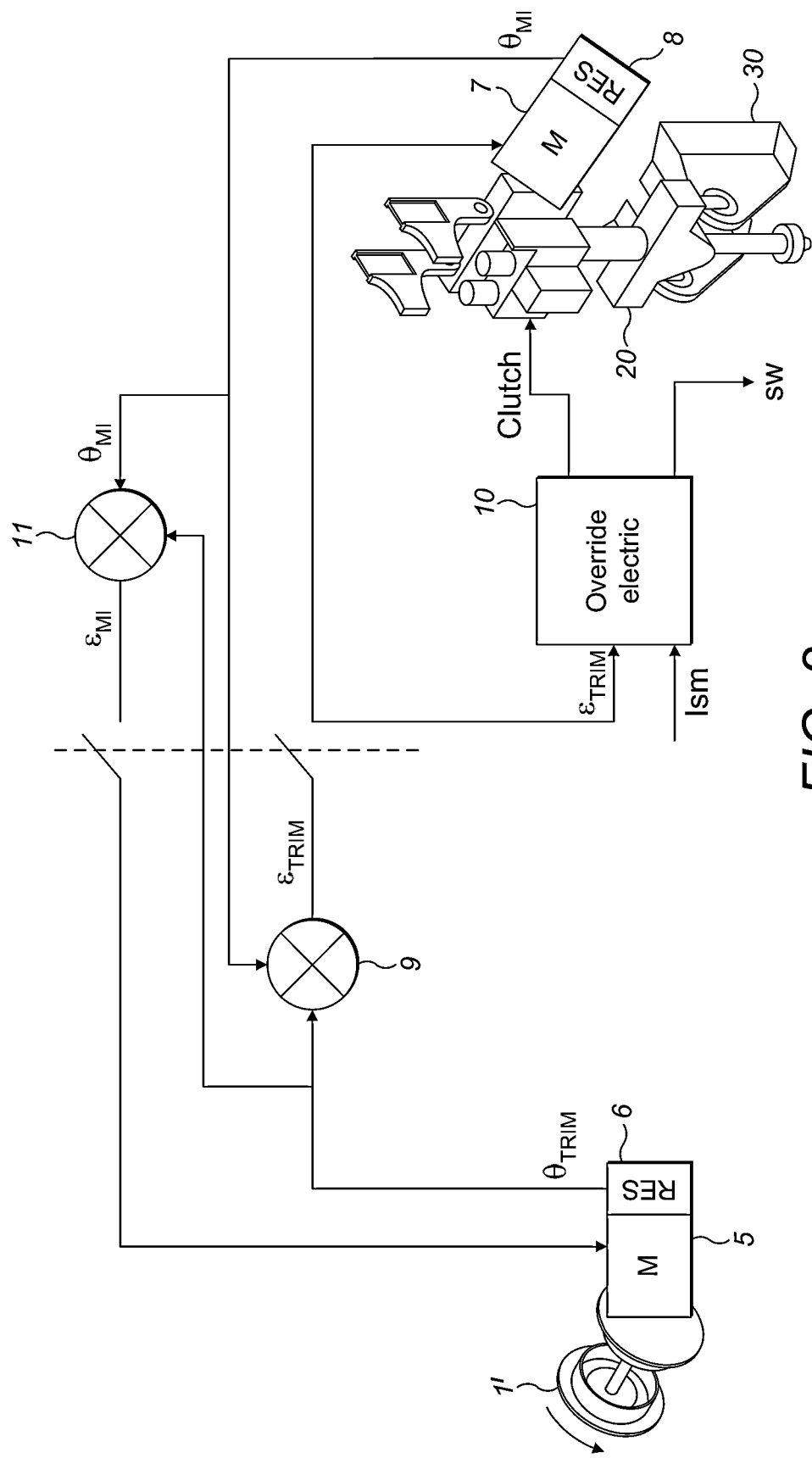
FIG. 2 is a schematic of a modified manual trim according to the disclosure.

In the system of the present disclosure, described with reference to FIG. 2, a motor 5 and a resolver 6 are installed at the trim wheel 1'. In addition, the mechanical input to the HSTA is replaced by a motor 7 and a resolver 8. Thus, the complex, bulky linkage 4 is replaced. This will simplify maintenance.

When a pilot wishes to take manual control of the HSTA, he turns the trim wheel 1. The rotation is detected by the first resolver 6, via the first motor 5, and is converted to an angle command $\theta_{TRIM}$. The angle command is received by the second motor 7 connected to the HSTA 20 to drive the HSTA 20 to cause a corresponding movement of the moveable surface 30.

In the preferred arrangement, the second resolver 8, at the HSTA, provides position feedback as part of the control. The resolver 8 detects the angular position of the moveable surface 30 (or the drive position of the HSTA 2). This provides an output indicative of mechanical input angle $\theta_{MI}$. When an angle command is sent from the trim wheel resolver 6, this is compared e.g. at comparator or summer 9 with the mechanical input angle from the HSTA resolver 8 and a command is sent to the HSTA based on the difference in the commanded position and the actual position. This command is sent to the motor 7 of the HSTA.

Feedback of the mechanical input angle, indicative of the position of the moveable surface, can also be fed back, from the HSTA resolver 8 mechanical input angle $\theta_{MI}$, to the trim wheel motor 5, via comparator 11, to turn the trim wheel 1' (via first motor 5) so that its rotary position corresponds to the position of the moveable surface so that, even when the HSTA is controlled automatically, via the FCC (not shown) the pilot has a visual indication—the trim wheel 1' position—as to the current position of the moveable surface.

In a preferred embodiment, the system is also arranged such that if a pilot provides a manual command to the HSTA, as described above, this overrides the automatic FCC control by means of an override circuit 10.

A conventional HSTA architecture includes three electrical motors connected to the FCC for the automatic control, as well as a manual input (as shown in FIG. 1) for the pilot. When the pilot takes control by means of the trim wheel 1' an override mechanism de-clutches the electrical motors to give priority to the manual pilot operation.

Figure 3:
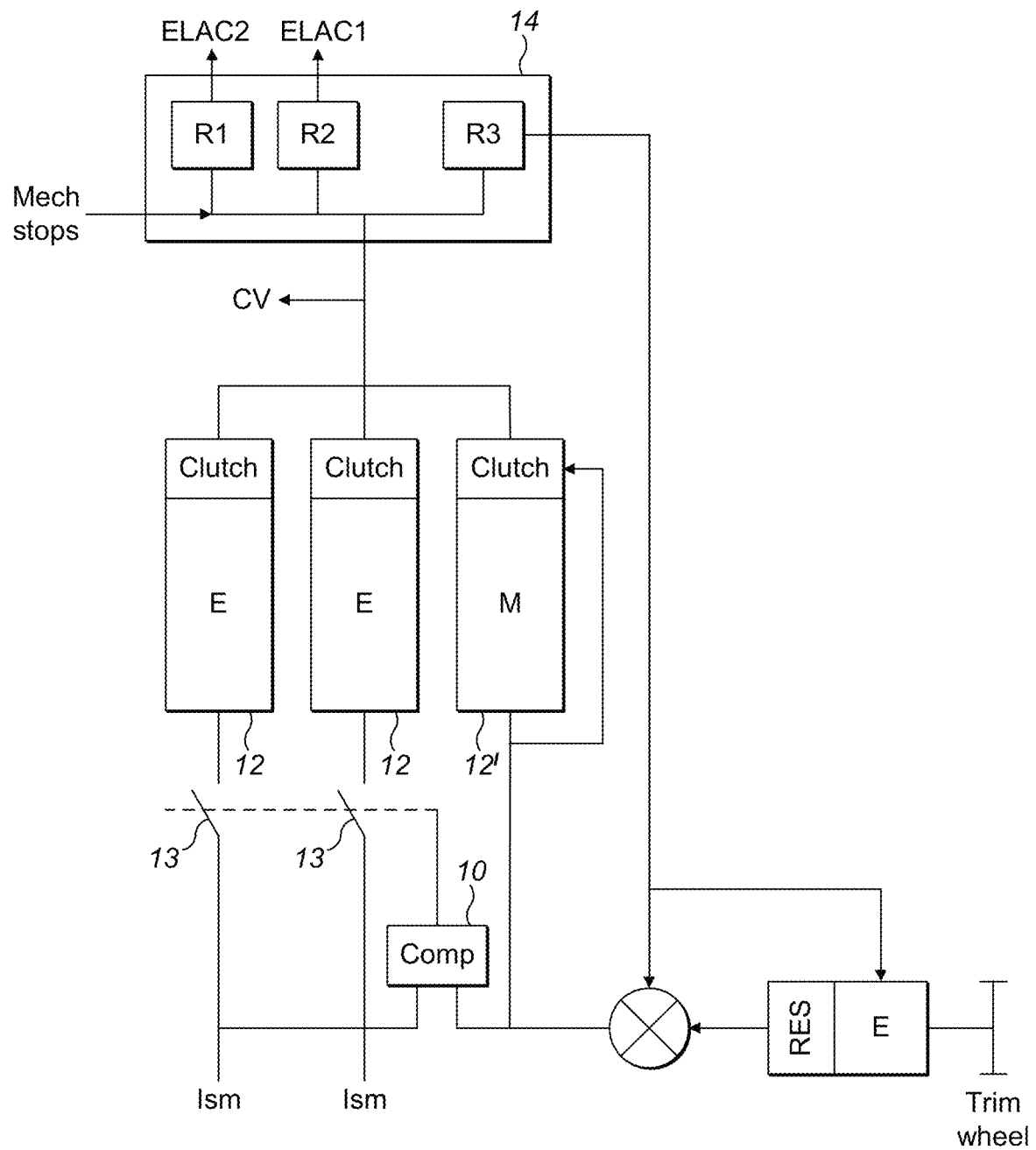
FIG. 3 is a schematic of a preferred arrangement according to the disclosure.

With reference to FIG. 3, during automatic control, control commands $I_{SM}$ are provided from the FCC (not shown) to control three electric motors 12,12' which drive the actuator (not shown) by signals ELAC1, ELAC2 via mechanical stops 14. In one preferred embodiment of the system of this disclosure described above in relation to FIG. 2, one of the three electric motors 12' usually used for the automatic FCC control can also be used as the HSTA motor 7 for the manual control. This also avoids the need for a mechanical overriding system, as the overriding function can be performed electrically.

As shown in, and described above in relation to, FIG. 2, once the trim wheel 1' is operated for the pilot to take manual control, this is compared with the FCC command, at 10. If the trim wheel command supersedes the FCC control, the electrical motors 12 are overridden—i.e. disconnected. In the preferred embodiment, when the manual operation takes over, two of the three motors 12 are disconnected e.g. by switches 11. The third motor 12', however, is used as an input motor 7 in the manual control architecture of FIG. 2.

As the motors and resolvers communicate via electric signals, the mechanical input and linkage is removed.

Using this preferred architecture, there is no need for a separate mechanical manual input to the HSTA, thus greatly simplifying the system and providing a simpler, smaller, lighter system that is easier to maintain and that is more responsive, thus improving position feedback accuracy.

The invention claimed is:

1. An assembly for controlling movement of a movable surface comprising:
    an actuator in engagement with the moveable surface; and
    an assembly for controlling the actuator, the assembly for controlling the actuator comprising:
    a horizontal stabilizer trim actuator (HSTA) of an aircraft in engagement with the moveable surface and an assembly for manual control of the HSTA for controlling a position of the moveable surface, the assembly for manual control of the HSTA comprising:
    a user-operated trim wheel, and
    transfer means configured to translate movement of the user-operated trim wheel to movement of the HTSA, the transfer means comprising: a first motor and a first resolver connected to the trim wheel and a second motor and a second resolver arranged to communicate with the first motor and the first resolver and to cause corresponding movement of the HTSA;
    wherein rotation of the trim wheel is detected by the first resolver, via the first motor, and is converted to an angle command, and wherein the second motor receives the angle command and drives the HSTA according to the angle command to cause a corresponding movement of the moveable surface, and wherein the second resolver detects the angular position of the moveable surface and provides an output indicative of mechanical input angle, the assembly further comprising a comparator arranged to compare the angle command with the mechanical input angle to provide a command to the second motor (7), based on the difference between the angle command and the mechanical input angle, to drive the HSTA responsive to the command;
    the assembly for controlling the actuator further comprising means for providing a feedback signal from the second resolver to the first motor indicative of the position of the HSTA, whereby the feedback signal causes corresponding movement of the trim wheel;
    the assembly for manual control of an actuator for controlling the position of a moveable surface further comprising:
    an automatic control arrangement for automatic control of the actuator via a control computer, and wherein operation of the assembly for manual control overrides operation of the automatic control arrangement;
    wherein the arrangement for automatic control of the actuator comprises a plurality of motors providing communication between the control computer and the actuator, and wherein, when the manual control overrides the automatic control, one of said plurality of motors operates as said second motor and the remaining of the plurality of motors is/are disconnected.

2. The assembly of claim 1, wherein the trim wheel is configured such that the user moves it by an amount or degree corresponding to or proportional to the desired movement of the movable surface.

* * * * *